United States Patent [19]

Sarkar

[11] Patent Number: 5,274,064
[45] Date of Patent: Dec. 28, 1993

[54] STAR POLYMERS CONTAINING HYDROLYSABLE GROUP-BEARING SILICON ATOMS

[75] Inventor: Manish Sarkar, Windsor, England

[73] Assignee: Imperial Chemical Industries PLC, London, United Kingdom

[21] Appl. No.: 662,028

[22] Filed: Feb. 28, 1991

[30] Foreign Application Priority Data

Mar. 23, 1990 [GB] United Kingdom ............... 9006558
Mar. 23, 1990 [GB] United Kingdom ............... 9006559

[51] Int. Cl.$^5$ .................. C08G 77/18; C08G 77/26; C08G 77/28; C08F 283/02
[52] U.S. Cl. ................................. 528/25; 528/26; 528/27; 528/28; 528/32; 528/38; 525/418; 525/451; 525/452; 525/474; 525/523; 525/535; 427/387
[58] Field of Search ............. 528/25, 26, 27, 28, 528/32, 38; 525/451, 452, 523, 418, 474, 535; 427/387

[56] References Cited

U.S. PATENT DOCUMENTS

| | | | |
|---|---|---|---|
| 3,717,617 | 2/1973 | Marrs et al. | 528/25 |
| 4,269,741 | 5/1981 | Homan | 528/32 |
| 4,269,963 | 5/1981 | Homan et al. | 528/32 |
| 4,281,094 | 7/1981 | Homan et al. | 528/32 |
| 4,284,539 | 8/1981 | Homan et al. | 528/32 |
| 4,340,707 | 7/1982 | Quis et al. | 526/289 |
| 4,429,099 | 1/1984 | Kennedy et al. | 528/98 |
| 4,439,291 | 3/1984 | Irving et al. | 528/192 |
| 4,558,120 | 12/1985 | Tomalia et al. | 525/451 |
| 4,568,737 | 2/1986 | Tomalia et al. | 525/451 |
| 4,587,329 | 5/1986 | Tomalia et al. | 525/451 |
| 5,041,516 | 8/1991 | Fréchet et al. | 528/45 |
| 5,162,452 | 11/1992 | Herzig et al. | 525/452 |

FOREIGN PATENT DOCUMENTS 2944092 5/1981 Fed. Rep. of Germany.
8600626 1/1986 World Int. Prop. O..

OTHER PUBLICATIONS

Chemical Abstracts, vol. 100, No. 22, May, 1984, p. 38 Abstract No. 175857v.

Primary Examiner—Maurice J. Welsh
Assistant Examiner—Rabon Sergent
Attorney, Agent, or Firm—Thomas M. Schmitz

[57] ABSTRACT

The invention provides a co-polymer comprising a hub portion from which radiate from 3 to 8 arms, where the hub portion being the residue of a trifunctional to octafunctional thiol and each arm is an addition polymer comprising structural units and functional units where the functional units contain hydrolysable group-bearing silicon atoms, optionally additional functional units each of which contain crosslinking groups that are the same or different and that are compatible with each other and the hydrolysable group-containing silicon atoms and optionally auxiliary functional units containing wetting groups.

25 Claims, No Drawings

STAR POLYMERS CONTAINING HYDROLYSABLE GROUP-BEARING SILICON ATOMS

This invention relates to certain novel polymers having hydrolysable group-bearing silicon atoms, to a process for their preparation and their use in coatings.

Co-polymers of the present invention have an idealised structure that can be regarded as consisting of a number of arms that radiate from a central point. Polymers having such geometry are referred to here colloquially as star polymers or polymers with star geometry. We have found that surprisingly coating compositions based on star polymers have more favourable application viscosities and cure characteristics than do coating compositions of the same resin solids content based on linear polymers of the same molecular weight.

Accordingly, the invention provides a co-polymer comprising a hub portion from which radiate from 3 to 8 arms, where the hub portion being the residue of a trifunctional to octafunctional thiol and each arm is an addition polymer comprising structural units and functional units where the functional units contain hydrolysable group-bearing silicon atoms, optionally additional functional units each of which contain crosslinking groups that are the same or different and that are compatible with each other and the hydrolysable group-containing silicon atoms and optionally auxiliary functional units containing wetting groups.

The co-polymers of this invention can have a total molecular weight of at least 3,000, and in practice the molecular weight will not be more than 150,000. Particularly it can be 3,000 to 20,000 or 3,000 to 15,000. Preferably the total molecular weight is 3,000 to 8,000. Molecular weight in this context is the apparent weight average molecular weight and is measured by the gel permeation chromatography method described in Example 1 below.

The hub portion in the co-polymers of the invention is the residue of a tri- to octafunctional thiol. Preferably the hub is the residue of a tri-, tetra- or hexafunctional thiol, especially a tetra- or hexafunctional thiol.

The trifunctional to octafunctional thiol can be aromatic or aliphatic. Examples of aromatic thiols are benzene-1,3,5-trithiol, 3,4,8,9-tetramercaptotetrathiafulvalene and 7-methyltrithiouric acid. Preferably, the thiol residue is the residue of an ester formed from a tri-functional to octa-functional alcohol and a mercapto $C_{2-6}$ alkanoic acid.

Examples of suitable alcohols are glycerol, sorbitol and especially alcohols having the general formula (1):

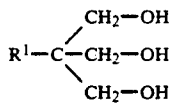

(1)

where $R^1$ is hydrogen, $C_{1-4}$ alkyl or hydroxy-$C_{1-4}$ alkyl, (especially methyl, ethyl, hydroxymethyl or hydroxyethyl) or a group of formula (2):

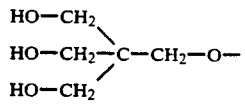

(2)

Examples of mercapto-$C_{2-6}$-alkanoic acids are 2-mercaptoacetic acid 2-mercaptopropionic acid, 3-mercaptopropionic acid, 4-mercaptobutyric acid, 5-mercaptopentanoic acid and 6-mercaptohexanoic acid. Preferably the mercaptoalkanoic acid is 2-mercaptoacetic or 3-mercaptopropionic acid.

Each arm of the star co-polymer is an addition polymer made up of structural units and functional units. As in conventional acrylic polymers, the distribution of such units is random.

The additional functional units contain crosslinking groups that are compatible with each other and with the hydrolysable group-bearing silicon atoms. This means that the crosslinking groups tend to undergo intermolecular crosslinking reactions with a crosslinking agent or with the same or complementary crosslinking groups or with hydrolysable groups bearing silicon atoms in other molecules of the same polymer.

Examples of crosslinking groups in the additional functional units are hydroxyl, carboxy, carboxyanhydride, isocyanate and epoxy. Where the co-polymer contains different additional functional units, the unit present in the largest amount will not usually exceed 95 mole % of the total of the additional functional units. Usually it will not exceed 90 mole % of the total.

Examples of wetting groups for the auxiliary functional units are 4-aminobenzoyloxy and 4-nitrobenzoyloxy.

The mole percentage of silicon group-containing functional units in the arms of a co-polymer of the invention can be from 3 to 20% calculated as a molar percentage of the silicon group-containing monomers in the total monomers making up those arms. Where the arms contain additional functional units the monomers from which the additional functional units are formed can comprise from 5 to 20% of the total monomers making up those arms.

Where the co-polymer has silicon containing functional units only, preferably the functional units comprise from 3 to 10% of the total monomers making up the arms.

Where the co-polymer also has additional functional units, then preferably the mole percentage of silicon group-containing functional units is from 9 to 14% and the mole percentage of additional functional units is from 9 to 13% of the total monomers making up the arms.

Where the co-polymer contains auxiliary functional units, the auxiliary functional unit will comprise 2 to 10 mole % of the total functional units making up the arms.

The functional units having hydrolysable group-containing silicon atoms can be derived from silicon group-containing ethylenic monomers, or ethylenic monomers containing carboxy, epoxy or isocyanate groups that have been reacted with an epoxysilane, a mercaptosilane or an aminosilane.

Examples of silicon group-containing ethylenic monomers are vinyl monomers of general formula (3):

(3)

where the groups $R^2$ are the same or different and are $C_{1-6}$ alkyl or $C_{1-4}$ alkoxy-$C_{1-4}$ alkyl, particularly methyl, ethyl and methoxyethyl.

Examples of compounds of formula (3) are: vinyltrimethoxysilane, vinyltriethoxysilane and vinyl-tris(2-methoxy-ethoxy)silane.

Another and preferable class of silicon group containing ethylenic monomers are acrylate and methacrylate esters of formula (4):

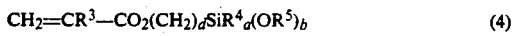
$$CH_2\!=\!CR^3\!-\!CO_2(CH_2)_d SiR^4{}_a(OR^5)_b \qquad (4)$$

where
$R^3$ is hydrogen or methyl,
$R^4$ is $C_{1-4}$ alkyl,
$R^5$ is $C_{1-4}$ alkyl,
a is 0, 1 or 2,
b is (3-a) and
d is 2 or 3.

Examples of $C_{1-4}$ alkyl groups for $R^4$ and $R^5$ are methyl, ethyl and propyl. A particular value for $R^4$ is methyl. Particular values for $R^5$ are methyl and ethyl.

Particular acrylate and methacrylate esters are: 3-acryloxyethyltrimethoxysilane, 3-acryloxypropyltrimethoxysilane, 3-acryloxypropylmethylmethoxysilane, 3-methacryloxypropyltriethoxysilane and 3-methacryloxypropylmethyldiethoxysilane.

As referred to above, the functional units having hydrolysable group-containing silicon atoms can also be derived from ethylenic monomers containing carboxy, epoxy, or isocyanate groups that are subsequently reacted with an epoxysilane, a mercaptosilane or an aminosilane.

Examples of carboxyl group-containing ethylenic monomers are acrylic, methacrylic and maleic acids.

Examples of epoxy-containing ethylenic monomers are, glycidylacrylate and glycidylmethacrylate.

Examples of isocyanato group-containing monomers are 2-(3-isopropenylphenyl)-2-isocyanatopropane and esters of formula (5):

$$CH_2\!=\!CR^6\!-\!CO_2R^7NCO \qquad (5)$$

where $R^6$ is hydrogen or $C_{1-4}$alkyl especially methyl and $R^7$ is $C_{2-6}$ alkane diyl especially ethane-1,2-diyl.

Isocyanate group-containing units can be converted into silicon group-containing units by reaction with aminosilane.

Carboxyl units in a formed polymer can be converted into silicon group-containing units by reaction with an epoxysilane.

Examples of epoxysilanes are compounds of formula (6):

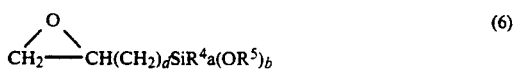
$$\underset{CH_2\!-\!-\!CH(CH_2)_d SiR^4{}_a(OR^5)_b}{\overset{O}{\diagup\!\diagdown}} \qquad (6)$$

where $R^4$, $R^5$, a, b, and d are as defined with reference to formula (4).

Glycidyl units in a formed polymer can be converted into silyl group containing units by reaction with an aminosilane or a mercaptosilane.

Examples of aminosilanes and mercaptosilanes are compounds of formula (7):

$$R^8(CH_2)_d SiR^4{}_a(OR^5)_b \qquad (7)$$

where
$R^8$ is HS— or $R^9$NH— where $R^9$ is hydrogen, methyl, aminoethyl, aminopropyl or carbamoyl,
$R^4$, $R^5$, a, b and d are as defined with reference to formula (4).

Examples of aminosilanes of formula (7) are: 3-aminopropyltrimethoxysilane, 3-aminopropyltriethoxysilane, N-methyl-3-aminopropyltrimethoxysilane, 3-aminopropylmethyldiethoxysilane, N-aminoethyl-3-aminopropyltriethoxysilane, N-aminoethyl-3-aminopropylmethyldimethoxysilane and 3-ureidopropyltriethoxysilane.

Examples of mercapto silanes of formula (7) are, 3-mercaptopropyltrimethoxysilane, 3-mercaptopropyltriethoxysilane and 3-mercaptopropylmethyldiethoxysilane.

Preferably the functional units having hydrolysable group-containing silicon atoms are acrylate or methacrylate esters of formula (4) above, in particular 3-methacryloxypropyltrimethoxysilane.

Where the second functional unit contains crosslinking groups for example hydroxy, carboxyanhydride, isocyanate or epoxy, the units can be derived from an appropriately substituted ethylenically unsaturated monomer.

Examples of hydroxyl group-containing monomers are allylalcohol and esters of formula (8):

$$CH_2\!=\!CR^{10}\!-\!CO_2R^{11}OH \qquad (8)$$

where $R^{10}$ is hydrogen or methyl and $R^{11}$ is $C_{2-6}$ alkanediyl especially ethane-1,2-diyl, propane-1,3-diyl and butane-1,4-diyl.

Examples of carboxy and carboxy anhydride group-containing monomers for the additional functional unit containing a crosslinking group are acrylic methacrylic and maleic acid and maleic anhydride.

Examples of epoxy and isocyanate group-containing monomers are discussed previously.

Examples of structural units are units derived from ethylenically unsaturated monomers in particular $C_{1-8}$ alkyl esters of acrylic or methacrylic acids, vinyl $C_{2-6}$ alkanoates and styrene and its $C_{1-4}$ alkyl analogues.

Examples of $C_{1-8}$ alkyl esters of acrylic and methacrylic acids are methyl methacrylate, ethyl methacrylate, propyl methacrylate, pentyl methacrylate, hexyl methacrylate, dodecyl methacrylate, ethyl acrylate, propyl acrylate, butyl acrylate, pentyl acrylate, hexyl acrylate, octyl acrylate and 2-ethylhexyl acrylate.

Examples of vinyl $C_{2-6}$ alkanoate esters are vinyl acetate, vinyl propionate and vinyl butanoate.

Examples of styrene and its $C_{1-4}$ alkyl analogues are 4-methyl styrene and 4-ethyl styrene.

Preferably the structural units are derived from methyl methacrylate, ethyl methacrylate, butyl methacrylate and butyl acrylate.

The identity and proportion of monomers directly affects the glass transition temperature (Tg) of the film forming polymer, therefore monomers and their proportions are selected to achieve a calculated glass transition temperature which is appropriate to the end use to which the film forming polymers are to be put. The identity and proportion of the monomers from which the functional units are derived is limited as previously discussed. Variations in Tg are therefore achieved by selection of the appropriate proportions of monomers providing structural units.

Co-polymers of the invention can have a wide range of Tg's for example, −5 to +100° C. Co-polymers having a Tg in the range of −5 to 55° C. are particularly useful in paints for respraying motor vehicles. Co-polymers having a Tg in the range +45 to 100° C. are particularly useful in the preparation of paints for painting motor vehicles especially in a vehicle manufacturing line.

The co-polymers of the present invention can be prepared by a process which comprises either (a) co-reacting at moderate to elevated temperatures a trito octa-functional thiol chain transfer agent with ethylenically unsaturated monomers that polymerise to form functional units containing hydrolysable group-bearing silicon atoms, optionally ethylenically unsaturated monomers that polymerise to form additional functional units having crosslinking groups that are the same or different and that are compatible with each other and with the hydrolysable group-bearing silicon atoms and optionally ethylenically unsaturated monomers containing wetting groups or (b) co-reacting at moderate to elevated temperatures a tri- to octafunctional thiol chain transfer agent with ethylenically unsaturated monomers that polymerise to form structural units and functional units containing carboxy, epoxy or isocyanate groups and thereafter reacting a carboxy group-containing co-polymer so formed at least partially with an epoxysilane, reacting an isocyanate group-containing co-polymer so formed at least partially with a mercaptosilane or aminosilane and reacting an epoxy group-containing co-polymer so formed at least partially with a mercaptosilane or an aminosilane and (c) reacting a product of step (b) containing epoxy group with 4 amino or 4-nitrobenzoic acid.

The reaction is carried out in the presence of an initiator for the free radical reaction for example, azobisisobutyronitrile.

The polymerisation reaction is carried out at moderate to elevated temperature. The precise temperature depends upon the specific initiator employed and the monomers to be polymerised. Usually the reaction is carried out at from 70 to 170° C. especially from 100 to 140° C.

The post-reaction between a carboxy group-containing co-polymer and an epoxysilane is carried out at moderate to low temperatures for example from ambient temperature to 100° C.

The post-reaction between epoxy or isocyanato group-containing co-polymers and for example the aminosilane takes place at low temperatures for example, ambient temperature.

The reaction between epoxy or isocyanato and the mercaptosilane takes place at moderate temperatures for example 60 to 120° C., optionally in the presence of a catalyst, for example triethylamine or quinuclidine.

The ring opening reaction between epoxy and 4-amino or 4-nitrobenzoic acid also takes place at moderate temperature optionally in the presence of an amine catalyst.

The polymerisation reaction and the post reaction of the co-polymer can be carried out in the presence of a non-interfering solvent or diluant for example a high boiling aromatic hydrocarbon, particularly xylene or a high boiling hydrocarbon solvent blend, for example 'Solvesso' or a $C_{1-6}$alkanoate ester for example butyl acetate.

The tri- to octafunctional thiols, the alcohols of formula (1), vinyl monomers of formula (3), acrylates and methacrylates of formula (4), isocyanates of formula (5), epoxysilanes of formula (6), aminosilanes and mercaptosilanes of formula (7) and esters of formula (8) are known, or can be made by analogy with known processes.

In use, the polymers of this invention are formulated with a volatile liquid diluant or carrier into coating compositions.

Examples of liquid carriers are aliphatic hydrocarbons, aromatic hydrocarbons, halogenated hydrocarbons, ketones, esters, ethers or alcohols.

The amount of the liquid carrier can be varied depending on the molecular weight or composition of the polymer so that the resulting composition is of an appropriate viscosity for the method of application chosen.

The compositions can also comprise an oligomer having hydrolysable group-bearing silicon atoms. These oligomers behave like crosslinking agents in that they form bonds between the film-forming star polymer. They must not be confused with the crosslinkers necessary in isocyanate based paints. The co-polymers of the present invention are capable of self-crosslinking to form a satisfactory crosslinked film.

The oligomers in question have a molecular weight up to about 2,000.

One class of oligomers are low molecular weight acrylic polymers containing hydrolysable group-bearing silicon atoms. The polymers are formed from acrylic monomers described with reference to the structural units of the co-polymers of the invention and silicon group-containing ethylenic monomers of formula (4). Oligomers of this type are known. They are described in EP-A-0063753 and EP-A-0231514 as interpolymers.

A further class of oligomers that can be used in this invention consist of adducts of a tri- to hexafunctional isocyanate and an aminosilane.

Oligomers of this type have been described in JA-A-604459 and EP-A-0267698.

A further class of oligomers of this invention are the adducts of an acrylate or methacrylate esters of a tri- to hexa-functional alcohol and an amino silane.

Oligomers of this type are known. They are described in EP-A-0231514 and US-A-4429652.

A further class of oligomers that can be used in the compositions of this invention are the addition products of an alkoxy silane and a trialkenyl isocyanurate. An example is, tris-N-[3-(trimethylsilyl)-propyl]-isocyanurate. This compound is available commercially.

Oligomers that are particularly useful in the composition of this invention have general formula (9):

$$AE_g \qquad (9)$$

where

A is the residue of a di-, tri-, or a tetrafunctional alcohol, g is respectively 2, 3 or 4, the groups E are the same or different and where A is the residue of an alcohol, each group E is an ester formed from that alcohol and a Michael Addition adduct of acrylic or methacrylic acid and an amino silane of the formula (7):

where $R^8$, $R^4$, $R^5$, a, b, and d are as previously defined.

and where A is the residue of an isocyanate, each E is the residue of either a urethane formed from a Michael Addition adduct of acrylyl or methacrylyl alcohol and an aminosilane of formula (7) above or a urea formed from an aminosilane of formula (7) above where $R^8$ is $NH_2$.

One class of alcohols for A are alkane diols especially $C_{2-10}$alkane diols. Examples are ethane-1,2-diol, propane-1,3-diol, butane-1,4-diol, pentane-1,5-diol, hexane-1,6-diol, octane-1,8-diol and decane-1,10-diol.

Another class of alcohols for A are of formula (10):

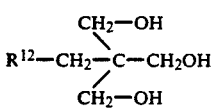
(10)

where $R^{12}$ is methyl or hydroxyl.

One class of isocyanates for A are alkane diisocyanates of formula (11):

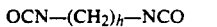
(11)

where h is from 2 to 10 inclusive, especially where h is 6.

Another class of isocyanates for constituent A are cyclic isocyanates for example isophorone-diisocyanate and toluene diisocyanate.

Another class of isocyanates for A are cyclic trimers of formula (12):

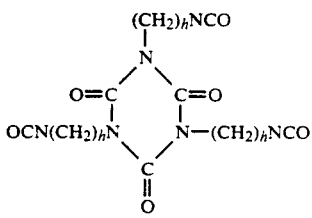
(12)

where h is from 2 to 10 inclusive especially 6.

Another class of isocyanates are adducts of one mole of a di- or triol referred to above as suitable for the group A with respectively two or three moles of a diisocyanate of formula (11) or isophorone diisocyanate or toluene diisocyanate.

Where E is the residue of an ester formed from a Michael Addition adduct of acrylic or methacrylic acid or acrylyl or methacrylyl alcohol, and aminosilane, the aminosilane can be for example any one of 3-aminopropyltrimethoxysilane, 3-aminopropylmethyldimethoxysilane, 3-aminopropyltriethoxysilane, 3-aminopropylmethyldiethoxysilane and N-methyl-3-aminopropyltrimethoxysilane.

Preferably A is the residue of a $C_{2-6}$alkane diol especially hexane-1,6-diol.

Preferably g is 2.

Preferably E is the residue of a Michael Addition adduct between methacrylic acid and 3-aminopropyltriethoxyethane or 3-aminopropylmethyldiethoxysilane.

The proportion of oligomer to co-polymer of the invention can be varied widely. For example the ratio by weight of oligomer to co-polymer can be from 1:20 to 1:1 particularly 1:10 to 1:2.

The composition can also comprise a catalyst that accelerates the reaction between the oligomer and polymer, such catalyst are known. Examples are tin salts, for example, dibutyl tin dilaurate, tin octoate and dibutyl tin oxide; amines for example triethylamine, tetramethylguanidine and triethylene diamine, and acids for example toluene sulphonic acid.

Where the co-polymer comprise functional units containing crosslinking groups, the compositions can also contain standard crosslinking agents known to react with those crosslinking groups.

The weight of catalyst used is up to 5% of the weight of the co-polymer component, preferably from 1 to 3% of the weight of the co-polymer component.

In addition, the composition can also comprise optional additives, for example UV absorbers and water scavengers or flow aids commonly used in paint formulations to modify application or final film properties.

The compositions of the invention can be prepared by mixing a co-polymer of the invention with a liquid carrier and any other optional additive.

The compositions of this invention can be used to coat a target object by applying a film to the surface of the object by standard techniques for example by dipping, brushing, roller coating or spraying allowing the solvent to evaporate and the film to cure.

The invention is illustrated by the following Examples where Examples 2, 4, 6 to 20, 22, 24 and 26 illustrate the invention and Examples 1, 3, 5, 21, 23 and 25 are comparative.

EXAMPLES

In the following Examples, Urad E27 means a polymeric acrylate flow agent sold by DSM Resins UK Ltd., as a 75% solution, in a solvent blend of a high boiling aromatic hydrocarbon, 'Solvesso' 200 (commercially available from Exxon) and n-butanol, 4:1.

Si 153 means, tris-N-[3-(trimethylsilyl)-propyl]-isocyanurate which has a silicon functionality of 0.487 moles per 100 g and is manufactured by Degussa.

UV Stabiliser, is a solution of a 50:50 blend of Tinuvin 328 and Tinuvin 292 (10% by weight) in a 50:50 blend of xylene and butyl acetate.

Urad, Solvesso and Tinuvin are trade marks.

Examples 1 to 20 are examples of silane functional polymers.

EXAMPLE 1

Preparation of Polymer Dispersion 1

A mixture of methyl methacrylate (971.61 g), ethyl acrylate (216.24 g), 3-methacryloxypropyltrimethoxysilane (161.98 g), n-octyl mercaptan (50.16) and 2,2-azobis (2-methylbutyronitrile) (67.49 g) was added over three hours with stirring to a mixture of butyl acetate (266.26 g) and a high boiling aromatic hydrocarbon commercially available from Shell Chemicals as 'Shellsol A' (266.26 g), (Shellsol is a trade mark) heated at reflux in an inert atmosphere.

The mixture was heated under reflux for a further one hour then cooled to 110° C. More 2,2-azobis (2-methylbutyronitrile) (3.3 g) was added and the temperature was maintained for a further one hour.

Cooling the reaction product yielded Polymer 1 as a dispersion having an actual solids content of 73.1%, a theoretical solids content of 70.0%, a Tg of 55° C., Polymer 1 itself having a functionality of 5.10 mole percent of silane groups on the total polymer, an apparent weight average molecular weight of 3891 (Mw) and an apparent number average molecular weight of 1761 (Mn) as determined using the Gel Permeation Chromatography technique as described in Gel Chromatography: Theory, Methodology & Application, T Kremmer: L Boross, Wiley Interscience 1979.

Preparation of Oligomer Dispersion 1

Trimethylolpropane triacrylate (472.0 g) in butyl acetate (150.0 g) was added over 1 hour with stirring to 3-aminopropyl triethoxysilane (1228.0 g) in butyl acetate (150.0 g), under dry air. The mixture was stirred for a further 1 hour and then heated to 60° C. for 2.5 hours. Cooling yielded a dispersion of Oligomer 1 having a theoretical non volatile content of 85.0%.

Clearcoat Composition 1

A clearcoat was prepared by mixing together the following components:

| Polymer Dispersion 1 (70% Solids) | 50.000 g |
| Oligomer Dispersion 1 (85% Solids) | 5.750 g |
| Dibutyl tin dilaurate | 0.175 g |
| Butyl acetate | 40.870 g |

The resulting composition had a theoretical non volatile content of 41.4% and a viscosity of 14 seconds as measured using a British Standards B4 viscosity cup at a temperature of 25° C.

EXAMPLE 2

Preparation of Polymer Dispersion 2

A mixture of methyl methacrylate (723.00 g), ethyl acrylate (157.00 g), 3-methacryloxypropyltrimethoxysilane (120.00 g), pentaerythritol tetramercaptopropionate (120.00 g) and 2,2-azobis (2-methylbutyronitrile) (70.10 g) was added over three hours with stirring to a mixture of butyl acetate (205.00 g) and a high boiling aromatic hydrocarbon commercially available from Shell Chemicals as 'Shellsol A' (205.00 g), heated at reflux in an inert atmosphere.

The mixture was heated under reflux for a further one hour then cooled to 110° C. More 2,2-azobis (2-methylbutyronitrile) (0.26) was added and the temperature was maintained for a further one hour.

Cooling the reaction product yielded Polymer 2 as a dispersion having an actual solids content of 72.7%, a theoretical solids content of 70.0%, a Tg of 55° C., Polymer 2 itself having a functionality of 5.20 mole percent of silane groups on the total polymer, an apparent weight average molecular weight of 4252 (Mw) and an apparent number average molecular weight of 1682 (Mn).

Clearcoat Composition 2

A clearcoat was prepared by mixing together the following components:

| Polymer Dispersion 2 (70% solids) | 50.000 g |
| Oligomer Dispersion 1 (85% solids) | 5.750 g |
| Dibutyl tin dilaurate | 0.175 g |
| Butyl acetate | 40.900 g |

The resulting composition had a theoretical non volatile content of 41.4% and a viscosity of 14 seconds as measured using a British Standards B4 viscosity cup at a temperature of 25° C.

EXAMPLES 3 to 12

Preparation of Polymer Dispersions 3 to 12

Polymer Dispersions 3 and 5 were prepared according to the method described for Polymer Dispersion 1. Polymer Dispersions 4 and 6 to 11 were prepared according to the method described for Polymer Dispersion 2. Polymer Dispersion 12 was prepared according to the method described for Polymer Dispersion 2 replacing pentaerythritol tetramercaptopropionate with dipentaerythritol hexamercaptopriopionate.

Table 1 shows the amounts of components used for each polymer dispersion and Table 2 shows the resulting properties of each polymer dispersion and polymer itself.

TABLE 1

(Polymer Dispersion 1 to 12 formulations)

| POLYMER No. | COMPONENTS (Figures are weight in grams) | | | | | | | | | |
|---|---|---|---|---|---|---|---|---|---|---|
| | 1. | 2. | 3. | 4. | 5. | 6. | 7. | 8. | 9. | 10. |
| 1 | 971.6 | 216.2 | 162.0 | 50.2 | — | — | 67.5 | 266.3 | 266.3 | 3.30 |
| 2 | 723.0 | 157.0 | 120.0 | — | 120.0 | — | 70.1 | 205.0 | 205.0 | 0.26 |
| 3 | 992.3 | 215.5 | 164.7 | 27.5 | — | — | 35.9 | 282.9 | 282.9 | 1.80 |
| 4 | 928.8 | 206.7 | 154.8 | — | 109.7 | — | 55.1 | 272.5 | 272.5 | 2.76 |
| 5 | 1002 | 217.6 | 166.4 | 13.8 | — | — | 27.8 | 286.1 | 286.1 | 1.40 |
| 6 | 630.5 | 137.0 | 104.6 | — | 27.9 | — | 5.2 | 447.4 | 447.4 | 0.26 |
| 7 | 976.5 | 217.3 | 162.8 | — | 43.4 | — | 67.8 | 266.1 | 266.1 | 3.40 |
| 8 | 922.5 | 264.6 | 103.2 | — | 109.7 | — | 64.5 | 267.7 | 267.7 | 3.23 |
| 9 | 943.4 | 140.5 | 206.5 | — | 109.7 | — | 64.5 | 267.7 | 267.7 | 3.23 |
| 10 | 553.5 | 581.9 | 154.8 | — | 109.7 | — | 64.5 | 267.7 | 267.7 | 3.23 |
| 11 | 1102 | 33.7 | 154.8 | — | 109.7 | — | 64.5 | 267.7 | 267.7 | 3.23 |
| 12 | 943.4 | 140.5 | 206.5 | — | — | 112.3 | 64.5 | 266.5 | 266.5 | 3.23 |

Where
1. = Methyl methacrylate
2. = Ethyl acrylate
3. = 3 methacryloxypropyltrimethoxysilane
4. = Primary octyl mercaptan
5. = Pentaerythritol tetramercaptopropionate
6. = Dipentaerythritol hexamercaptopriopionate
7. = 2,2-azobis(2-methylbutyronitrile)
8. = Shellsol A (high boiling aromatic hydrocarbon)
9. = Butyl acetate
10. = 2,2-azobis(2-methylbutyronitrile)

TABLE 2

Properties of Polymer Dispersions 1 to 12

| POLYMER No. | NON VOL (%) ACTUAL | NON VOL (%) THEORETICAL | FUNCTIONALITY (MOLE % SI GRPS) IN TOTAL POLYMER | Tg (°C.) | MOLECULAR WEIGHT (Mw) | MOLECULAR WEIGHT (Mn) |
| --- | --- | --- | --- | --- | --- | --- |
| 1 | 73.1 | 70.0 | 5.1 | 55 | 3891 | 1761 |
| 2 | 72.7 | 70.0 | 5.2 | 55 | 4252 | 1682 |
| 3 | 70.4 | 70.0 | 5.1 | 55 | 5338 | 2739 |
| 4 | 69.9 | 70.0 | 5.2 | 55 | 5700 | 2700 |
| 5 | 72.4 | 70.0 | 5.2 | 55 | 10591 | 5348 |
| 6 | 50.0 | 50.0 | 5.2 | 55 | 13634 | 5217 |
| 7 | 72.5 | 70.0 | 5.2 | 55 | 6716 | 3334 |
| 8 | 70.1 | 70.0 | 3.4 | 55 | 4376 | 2440 |
| 9 | 69.8 | 70.0 | 7.1 | 55 | 4535 | 2467 |
| 10 | 70.5 | 70.0 | 5.2 | 20 | 4043 | 2155 |
| 11 | 72.0 | 70.0 | 5.2 | 80 | 4347 | 2213 |
| 12 | 70.4 | 70.0 | 7.1 | 55 | 5269 | 2345 | where FUNCTIONALITY is expressed as the mole percentage of functional group-containing monomers as a percentage of total monomers (excluding thiol hub portion) making up the total polymer.

Clearcoat Compositions 3 to 12

Clearcoat compositions 3 to 12 were prepared exactly as described in clearcoat composition 1. Table 3 shows the quantities of each component and Table 4 the resulting properties of each clearcoat composition.

TABLE 3

(Clearcoat Composition forulations 1 to 12)

| CLEARCOAT COMPOSITION | POLYMER[1] No. | POLYMER[1] (g) | OLIGOMER[1] No. | OLIGOMER[1] (g) | DBTDL (g) | BUTYL ACETATE (g) |
| --- | --- | --- | --- | --- | --- | --- |
| 1 | 1 | 50.0 | 1 | 5.75 | 0.175 | 40.9 |
| 2 | 2 | 50.0 | 1 | 5.75 | 0.175 | 40.9 |
| 3 | 3 | 50.0 | 1 | 5.75 | 0.175 | 40.9 |
| 4 | 4 | 50.0 | 1 | 5.75 | 0.175 | 40.9 |
| 5 | 5 | 50.0 | 1 | 5.75 | 0.175 | 40.9 |
| 6 | 6 | 70.0 | 1 | 5.75 | 0.175 | 20.9 |
| 7 | 7 | 50.0 | 1 | 5.75 | 0.175 | 40.9 |
| 8 | 8 | 50.0 | 1 | 5.75 | 0.175 | 40.9 |
| 9 | 9 | 50.0 | 1 | 5.75 | 0.175 | 40.9 |
| 10 | 10 | 50.0 | 1 | 5.75 | 0.175 | 40.9 |
| 11 | 11 | 50.0 | 1 | 5.75 | 0.175 | 40.9 |
| 12 | 12 | 50.0 | 1 | 5.75 | 0.175 | 40.9 |

[1]The amount in grams refers to the amount of the dispersion.

TABLE 4

Properties of Clearcoat Compositions 1 to 12

| CLEARCOAT COMPOSITION | THEORETICAL NON VOL (%) | VISCOSITY BSB4 (25° C.) (SECS) |
| --- | --- | --- |
| 1 | 41.4 | 14 |
| 2 | 41.4 | 14 |
| 3 | 41.4 | 18 |
| 4 | 41.4 | 17 |
| 5 | 41.4 | 20 |
| 6 | 41.4 | 17 |
| 7 | 41.4 | 25 |
| 8 | 41.4 | 14 |
| 9 | 41.4 | 15 |
| 10 | 41.4 | 13 |
| 11 | 41.4 | 14 |
| 12 | 41.4 | 14 |

EXAMPLE 13

Preparation of Polymer Dispersion 13

A mixture of n-butyl methacrylate (150.0 g), 3-methacryloxypropyltrimethoxy-silane (93.0 g), methyl methacrylate (272.8 g), t-butylacrylate (379.6 g), azobisisobutyronitrile (18.0 g) and pentaerythritoltetramercaptopropionate (29.5 g), was added with stirring to xylene (187.7 g) heated at reflux.

The mixture was heated under reflux for a further one hour. More azobisisobutyronitrile (3.4 g) was added and heating under reflux was continued for 80 minutes. The reaction product was cooled and diluted with more xylene (288.0 g).

Preparation of Oligomer Dispersion 2

Trimethylolpropane triacrylate (22.1 g) in xylene (7.5 g) was added with stirring over 1 hour to 3-aminopropyltriethoxysilane (58.3 g) in xylene (7.5 g), under dry air and the mixture was stirred at ambient temperature for one hour.

The mixture was then heated at 60° C. for 2 hours. The final product had a theoretical non volatile content of 84.3%.

Clearcoat Composition 13

A clearcoat was prepared by mixing together the following components:

| | |
| --- | --- |
| Polymer Dispersion 13 (64.5% solids) | (120.0 g) |
| Oligomer Dispersion 2 (84.3% solids) | (25.5 g) |
| Dibutyl tin dilaurate | (2.0 g) |
| xylene | (30.0 g). |

EXAMPLE 14

Preparation of Polymer Dispersion 14

A mixture of methyl methacrylate (71.2 g), butyl methacrylate (8.85 g), butyl acrylate (8.85 g), 3-methacryloxypropyltrimethoxy-silane (11.1 g), pentaerythritol tetramercaptopropionate (3.2 g) and azobisisobutyronitrile (1.3 g), was added with stirring to a hot (110° C.) mixture of butyl acetate (50.0 g) and $C_{10}$ aromatic hydrocarbon solvent 'Solvesso 100' (16.67 g; commercially available from Exxon) under nitrogen.

Two further portions of azobisisobutyronitrile (0.1 g) were added to the mixture and the temperature was maintained for 60 minutes after each addition.

Preparation of Oligomer Dispersion 3

Hydroxy butyl acrylate (770 g), was added over 30 minutes with stirring to a commercial solution of hexamethylene diisocyanurate trimer (1129 g; sold under the trade name HDT-90 by Rhone Poulenc as a 90% non-vol solution in butyl acetate: $C_{10}$ hydrocarbon solvent, 'Solvesso 100', 1:1) and butyl acetate (1078 g) under a nitrogen/ oxygen mixture (96:4), at 70° C.

The mixture so obtained was heated to 90° C. until all the isocyanate had reacted, as seen by infra-red spectrophotometry (9-11 hours).

The mixture was diluted with dipropylene glycol methyl ether (Dowanol Dpm; 50 g) (Dowanol is a trade mark) and the solvent was evaporated at reduced pressure. The residue was cooled to 25° C. and dissolved in dry butyl acetate (3 Kg). To this solution was added over 30 min a mixture of 3-aminopropyltriethoxysilane (1.181 Kg) and butyl acetate (337 g). The mixture was stirred at 25° C. until all the carbonyl had reacted, as shown by infra-red spectrophotometry (2 hrs).

The final product had a theoretical non-volatile content of 40%.

Clearcoat Composition 14

The following components were mixed together:

| Polymer Dispersion 14 (60% solids) | (110.4 g) |
| Oligomer Dispersion 3 (40% solids) | (20.5 g) |
| UV Stabiliser | (15.8 g) |
| Ethoxy ethyl propionate | (6.0 g) |
| Butyl acetate | (27.4 g) |
| Ethyl acetate | (20.0 g) |
| Urad E27 | (0.6 g) |
| Dibutyl tin dilaurate | (0.2 g) |

EXAMPLE 15

Preparation of Polymer Dispersion 15

This was prepared exactly as described for Polymer Dispersion 14 using the following amounts of components:

| Toluene | (439.7 g) |
| Methyl methacrylate | (297.1 g) |
| Butyl methacrylate | (16.5 g) |
| Butyl acrylate | (16.5 g) |
| Styrene | (198.1 g) |
| 3-Methacryloxypropyl-trimethoxysilane | (132.0 g) |
| Pentaerythritoltetra-mercaptopropionate | (33.0 g) |
| Azobisisobutyronitrile | (33.0 g) |
| Azobisisobutyronitrile | (1.0 g) |
| Azobisisobutyronitrile | (1.0 g) |

Clearcoat Composition 15

The following components were mixed together:

| Polymer Dispersion 15 (60% solids) | (100.0 g) |
| Oligomer Dispersion 3 (40% solids) | (51.0 g) |
| Dibutyl tin dilaurate | (1.8 g) |
| Xylene | (50.0 g) |

EXAMPLE 16

Preparation of Polymer Dispersion 16

This was prepared exactly as described for Polymer Dispersion 14 using the following amounts of components:

| Butyl acetate | (659.8 g) |
| "Solvesso" 100 | (219.8 g) |
| Methyl methacrylate | (950.4 g) |
| Butyl methacrylate | (132.0 g) |
| Butyl acrylate | (132.0 g) |
| 3-Methacryloxypropyl-trimethoxysilane | (105.6 g) |
| Pentaerythritoltetra-mercaptopropionate | (42.2 g) |
| Azobisisobutyronitrile | (13.2 g) |
| Azobisisobutyronitrile | (2.0 g) |
| Azobisisobutyronitrile | (2.0 g) |

Clearcoat Composition 16

The following components were mixed together:

| Polymer Dispersion 16 (60% solids) | (100.0 g) |
| Oligomer Dispersion 3 (40% solids) | (13.4 g) |
| Dibutyl tin dilaurate | (2.04 g) |
| Butyl acetate | (61.27 g) |

EXAMPLE 17

Preparation of Polymer Dispersion 17

This was prepared exactly as described for Polymer Dispersion 14 using the following amounts of components:

| Butyl acetate | (659.8 g) |
| "Solvesso" 100 | (219.8 g) |
| Methyl methacrylate | (584.9 g) |
| Butyl methacrylate | (301.5 g) |
| Butyl acrylate | (301.6 g) |
| 3-Methacryloxypropyl-trimethoxysilane | (132.0 g) |
| Pentaerythritoltetra-thiolglycolate | (30.2 g) |
| Azobisisobutyronitrile | (39.6 g) |
| Azobisisobutyronitrile | (2.0 g) |

Clearcoat Composition 17

The following components were mixed together:

| Polymer Dispersion 17 (60% solids) | (100.0 g) |
| Oligomer Dispersion 3 (40% solids) | (13.4 g) |
| Dibutyl tin dilaurate | (2.04 g) |
| Butyl acetate | (61.27 g) |
| Butyl acetate | (2.0 g) |

EXAMPLE 18

Preparation of Polymer Dispersion 18

This was prepared as the method described for Polymer Dispersion 14, but replaces butyl acrylate and butyl methacrylate with ethyl acrylate and includes an extra initiator feed, which was added to the polymer over a period of 30 minutes after completion of the monomer feed.

The following amounts of components were used:

| | |
|---|---|
| Butyl acetate | (1102.5 g) |
| "Solvesso" 100 | (367.5 g) |
| Methyl methacrylate | (1622.25 g) |
| Ethyl acrylate | (378.0 g) |
| 3-Methacryloxypropyl-trimethoxysilane | (249.75 g) |
| Pentaerythritol-tetramercaptopropionate | (72.0 g) |
| Azobisisobutyronitrile | (20.25 g) |
| Butyl acetate | (22.5 g))2nd |
| "Solvesso" 100 | (7.5 g))init |
| Azobisisobutyronitrile | (6.75 g))feed |

Clearcoat Composition 18

The following components were mixed together:

| | |
|---|---|
| Polymer Dispersion 18 (60% solids) | (100.0 g) |
| Oligomer Dispersion 3 (40% solids) | (18.65 g) |
| UV Stabiliser | (14.32 g) |
| Urad E27 | (0.54 g) |
| Dibutyl tin dilaurate | (0.18 g) |
| Ethyl 3-ethoxy propionate | (9.8 g) |
| Butyl acetate | (24.8 g) |
| Ethyl acetate | (18.1 g) |

EXAMPLE 19

Coating Composition 19

The following components were mixed together:

| | |
|---|---|
| Polymer Dispersion 18 (62.9% solids) | (100.0 g) |
| Si-153 | (2.76 g) |
| UV Stabiliser | (13.3 g) |
| Urad E27 | (0.5 g) |
| Diazobicyclooctane | (0.3 g) |
| Dibutyl tin dilaurate | (0.18 g) |
| Ethyl 3-ethoxypropionate | (6.4 g) |
| Butyl acetate | (29.1 g) |
| Ethyl acetate | (21.3 g) |

EXAMPLE 20

Preparation of Oligomer Dispersion 4

Trimethylolpropane triacrylate (26.7 g) in xylene (7.5 g) was added over 1 hour with stirring to 3-aminopropyltriethoxysilane (58.3 g) in xylene (7.5 g), under dry air and the mixture was stirred at ambient temperature for one hour. The temperature was then raised to 60° C. and maintained for 2 hours.

This gave a product which has a theoretical non volatile content of 85.0%.

Coating Composition 20

The following components were mixed together:

| | |
|---|---|
| Polymer Dispersion 18 (61.9% solids) | (100.0 g) |
| Oligomer Dispersion 4 (85% solids) | (5.1 g) |
| UV Stabiliser | (13.7 g) |
| Urad E27 | (0.5 g) |
| Dibutyl tin dilaurate | (0.18 g) |
| Ethyl 3-ethoxypropionate | (6.5 g) |
| Butyl acetate | (29.8 g) |
| Ethyl acetate | (21.8 g) |

Table 5 shows the properties of the polymer dispersions 13 to 20 and Table 6 the clearcoat properties.

TABLE 5

Properties of Polymer Dispersions 13 to 18

| POLYMER No. | NON VOL (%) | FUNCTIONALITY (MOLE % Si GROUPS IN TOTAL POLYMER) | Tg (°C.) |
|---|---|---|---|
| 13 | 64.5 | 5.26 | |
| 14 | 60.0 | 5.07 | 55.0 |
| 15 | 60.0 | 9.64 | 55.0 |
| 16 | 60.0 | 3.58 | 55.0 |
| 17 | 60.0 | 4.90 | 19.0 |
| 18 | 61.9 | 4.79 | 55.0 |

TABLE 6

Properties of Clearcoat Compositions 13 to 20

| CLEARCOAT COMPOSITION No. | NON VOL (%) |
|---|---|
| 13 | 55.9 |
| 14 | 38.2 |
| 15 | 40.5 |
| 16 | 38.1 |
| 17 | 37.7 |
| 18 | 38.1 |
| 19 | 37.4 |
| 20 | 37.3 |

EXAMPLE 21

An example of a carboxy silane functional linear polymer.

Preparation of Polymer Dispersion 21

A mixture of methyl methacrylate (395.88 g), butyl acrylate (622.68 g), acrylic acid (181.44 g) and tertiary butyl per-2-ethylhexanoate (60.0 g) was added over three hours with stirring to a mixture of butyl acetate (400.0 g) and $C_9$ aromatic hydrocarbon solvent, commercially available from EXXON as 'Solvesso 100' (400.00 g) heated at reflux.

Tertiary butyl per-2-ethylhexanoate (2.0 g) was added to the mixture. A similar addition was made after 10 minutes. A further four additions at intervals of 10 minutes were made to the mixture heated at reflux.

The temperature was maintained at reflux for a further 2 hours and 40 minutes.

The reaction product yielded polymer dispersion having a solids content of 60.1%, a Tg of 0° C., the polymer itself having a functionality of 22.2 mole percent of carboxyl groups on the total polymer and an apparent molecular weight of 6706 (Mw), 2994 (Mn).

To a portion of the cooled (80° C.), reaction product (50.00 g) glycidoxypropyltrimethoxysilane (7.32 g) was added with stirring. The mixture was then cooled and thinned with a solvent mixture of butyl acetate and Solvesso 100 (1:1, 62.83 g).

Clearcoat Composition 21

A clearcoat was prepared by mixing together Polymer Dispersion 21 (120.15 g) with Oligomer Dispersion 1 (85% solids, 5.76 g) and dibutyl tin dilaurate (0.17 g). The final product had a non volatile content of 64.4%.

EXAMPLE 22

An example of a carboxy silane functional star polymer.

Preparation of Polymer Dispersion 22

A mixture of methyl methacrylate (395.88 g), butyl acrylate (622.68 g), acrylic acid (181.44 g), pentaerythritol tetramercaptopropionate (36.00 g) and tertiary butyl per-2-ethylhexanoate (60.0 g) was added over three hours with stirring to a mixture of butyl acetate (400.0g) and 'Solvesso 100' (400.00 g) heated at reflux.

Tertiary butyl per-2-ethylhexanoate (2.0 g) was added to the mixture. A similar addition was made after 10 minutes. A further four additions at intervals of 10 minutes were made to the mixture heated at reflux.

The temperature was maintained at reflux for a further 2 hours and 40 minutes.

The reaction product yielded polymer dispersion having a solids content of 60.8%, a Tg of 0° C., the polymer itself having a functionality of 22.2 mole percent of carboxyl groups on the total polymer and an apparent molecular weight of 6568 (Mw), 2819 (Mn).

To a portion of the cooled (80° C.) reaction product (50.0 g) glycidoxypropyl-trimethoxysilane (7.41 g) was added with stirring. The mixture was then further cooled and thinned with a solvent mixture of butyl acetate and Solvesso 100 (1:1, 64.14 g).

Clearcoat Composition 22

A clearcoat was prepared by mixing together Polymer dispersion 22 (121.53 g) with Oligomer dispersion 1 (85% solids, 5.83 g) and dibutyl tin dilaurate (0.17 g). The final product had a non volatile content of 65.0%.

EXAMPLE 23

An example of an epoxy silane functional linear polymer.

Preparation of Polymer Dispersion 23

A mixture of methyl methacrylate (322.24 g), butyl acrylate (537.39 g), glycidyl methacrylate (340.97 g) and tertiary butyl per-2-ethylhexanoate (70.04 g) was added over three hours with stirring to a mixture of butyl acetate (400.0 g) and 'Solvesso 100' (400.00 g) heated at reflux.

Tertiary butyl per-2-ethylhexanoate (2.0 g) was added to the mixture. A similar addition was made after 10 minutes. A further four additions at intervals of 10 minutes were made to the mixture heated at reflux.

The temperature was maintained at reflux for a further 2 hours and 25 minutes.

The reaction product yielded polymer dispersion having a solids content of 59.3%, a Tg of 0° C., the polymer itself having a functionality of 24.45 mole percent of epoxy groups on the total polymer and an apparent molecular weight of 5217 (Mw), 2574 (Mn).

To a portion of the cooled (80° C.) reaction product (50.00 g) N-methyl-3-amino-propyl trimethoxysilane (6.01 g) was added with stirring. The mixture was then cooled and thinned with a solvent mixture of butyl acetate and Solvesso 100 (1:1, 58.50 g).

Clearcoat Composition 23

A clearcoat was prepared by mixing together Polymer dispersion 23 (114.51 g) and Oligomer dispersion 1 (85% solids, 5.68 g) and dibutyl tin dilaurate 0.17 g). The final product had non volatile content of 62.8%.

EXAMPLE 24

An example of an epoxy silane functional star polymer.

Preparation of Polymer Dispersion 24

A mixture of methyl methacrylate (322.24 g), butyl acrylate (537.39 g), glycidyl methacrylate (340.97 g), pentaerythritol tetramercaptopropionate (36.0 g) and tertiary butyl per-2-ethylhexanoate 60.0 g) was added over three hours with stirring to a mixture of butyl acetate (400.0 g) and 'Solvesso 100' (400.00 g) heated at reflux.

Tertiary butyl per-2-ethylhexanoate (2.0 g) was added to the mixture. A similar addition was made after 10 minutes. A further four additions at intervals of 10 minutes were made to the mixture heated at reflux.

The temperature was maintained at reflux for a further 2 hours and 25 minutes.

The reaction product yielded polymer dispersion having a solids content of 59.3%, a Tg of 0° C., the polymer itself having a functionality of 24.45 mole percent of epoxy groups on the total polymer and an apparent molecular weight of 5208 (Mw), 2524 (Mn).

To a portion of the cooled (80° C.) reaction product (50.00 g) N-methyl-3-amino-propyl trimethoxysilane (6.07 g) was added with stirring. The mixture was then cooled and thinned with a solvent mixture of butyl acetate and Solvesso 100 (1:1, 59.59 g).

Clearcoat Composition 24

A clearcoat was prepared by mixing together Polymer dispersion 24 (115.66 g) with Oligomer dispersion 1 (85% solids, 5.74 g) and dibutyl tin dilaurate (0.17 g). The final product had a non volatile content of 63.4%.

EXAMPLE 25

An example of an isocyanate silane functional linear polymer.

Preparation of Polymer Dispersion 25

A mixture of methyl methacrylate (134.82 g), butyl acrylate (211.92 g), 2-(3'-isopropenylphenyl)-2-isocyanatopropane (253.26 g) tertiary butyl per-2-ethylhexanoate (35.0 g) was added over three hours with stirring to a mixture of butyl acetate (200.0 g) and 'Solvesso 100' (200.00 g) heated at reflux.

Tertiary butyl per-2-ethylhexanoate (1.0 g) was added to the mixture. A similar addition was made after 10 minutes. A further four additions at intervals of 10 minutes were made to the mixture heated at reflux.

The temperature was maintained at reflux for a further 3 hours.

Three further additions of tertiary butyl per-2-ethylhexanoate (1.0 g) were made to the mixture and the temperature maintained at reflux for a further 5 hours.

The reaction product yielded polymer dispersion having a solids content of 59.7%, a Tg of 0° C., the polymer itself having a functionality of 29.55 mole percent of isocyanate groups on the total polymer and an apparent molecular weight of 5448 (Mw), 2205 (Mn).

To a portion of the cooled (80° C.), reaction product (50.00 g) N-methyl-3-amino-propyl trimethoxysilane (6.05 g) was added with stirring. The mixture was then cooled to room temperature and thinned with a solvent mixture of butyl acetate and Solvesso 100 (1:1, 59.23 g).

Clearcoat Composition 25

A clearcoat was prepared by dropwise addition of Oligomer dispersion 1 (85% solids, 5.72 g) to Polymer dispersion 25 (115.28 g) with vigorous stirring, followed by dibutyl tin dilaurate (0.17 g). The final product had a non volatile content of 63.2%.

EXAMPLE 26

An example of an isocyanate silane functional star polymer.

Preparation of Polymer Dispersion 26

A mixture of methyl methacrylate (134.82 g), butyl acrylate (211.92 g), 2-(3'-isopropenylphenyl)-2-isocyanatopropane (253.26 g), pentaerythritol tetramercapto-propionate (18.0 g) and tertiary butyl per-2-ethyl hexanoate (35.0 g) was added over three hours with stirring to a mixture of butyl acetate (200.0 g) and 'Solvesso 100' (200.0 g) heated at reflux.

Tertiary butyl per-2-ethylhexanoate (1.0 g) was added to the mixture. A similar addition was made after 10 minutes. A further four additions at intervals of 10 minutes were made to the mixture heated at reflux.

The temperature was maintained at reflux for a further 3 hours.

Two further additions of tertiary butyl per-2-ethylhexanoate (1.0 g) were made to the mixture and the temperature maintained at reflux for a further 4 hours.

The reaction product yielded polymer dispersion having a solids content of 61.5%, a Tg of 0° C., the polymer itself having a functionality of 29.55 mole percent of isocyanate groups on the total polymer and an apparent molecular weight of 5448 (Mw), 2205 (Mn).

To a portion of the cooled (80° C.) reaction product (50.00 g) N-methyl-3-amino-propyl trimethoxysilane (6.23 g) was added with stirring. The mixture was then cooled to room temperature and thinned with a solvent mixture of butyl acetate and Solvesso 100 (1:1, 62.52 g).

Clearcoat Composition 26

A clearcoat was prepared by dropwise addition of Oligomer dispersion 1 (85% solids, 5.89 g) to Polymer dispersion 26 (118.75 g) with vigorous stirring followed by dibutyl tin dilaurate (0.17 g). The final product had a non volatile content of 64.9%.

Table 7 shows the properties of the polymer dispersions 21 to 26.

TABLE 7

Properties of Polymer Dispersions 21 to 26

| POLYMER NUMBER | NON VOL (%) | FUNCTIONALITY (MOLE %) | |
|---|---|---|---|
| 21 | 9.98 | (Carboxyl) | 10.17 (Silane) |
| 22 | 9.94 | (Carboxyl) | 10.45 (Silane) |
| 23 | 10.79 | (Epoxy) | 11.70 (Silane) |
| 24 | 10.77 | (Epoxy) | 11.90 (Silane) |
| 25 | 12.81 | (Isocyanate) | 13.32 (Silane) |
| 26 | 12.73 | (Isocyanate) | 13.84 (Silane) | where FUNCTIONALITY is expressed as the mole percentage of functional group-containing monomers as a percentage of total monomers (excluding thiol hub portion) making up the total polymer.

VISCOSITY MEASUREMENTS

The viscosities of Polymer dispersions 1 to 5, 7 to 12 and 21 to 26 were measured using a Brookfield Engineering Laboratories Incorporated LVT Viscometer with spindle number 2 at a temperature of 25° C.

Polymer dispersions 1 to 5 and 7 to 12 were measured as initially prepared and were then thinned with butyl acetate to non volatile contents of 60% and 50% and the viscosity measured again.

Polymer dispersions 21 to 26 were thinned with butyl acetate to non volatile contents of 50% and 40% and their viscosities measured as above.

Tables 8 and 9 below show the viscosities of the polymer dispersions.

TABLE 8

Viscosities of Polymer Dispersions 1 to 12

| POLYMER DISP'N NUMBER | POLYMER TYPE | VISCOSITY (POISE) | | |
|---|---|---|---|---|
| | | 70% NV | 60% NV | 50% NV |
| 1 | Linear/Low Molecular Wt./Med Tg/Med Si Func. | 90.00 | 4.90 | 0.75 |
| 2 | 4 arm Star/Low Molecular Wt./Med Tg/Med Si Func. | 26.4 | 2.50 | 0.50 |
| 3 | Linear/Med Molecular Wt./Med Tg/Med Si Func. | 240.0 | 5.75 | 1.20 |
| 4 | 4 arm Star/Med Molecular Wt./Med Tg/Med Si Func. | 78.0 | 5.75 | 0.95 |
| 5 | Linear/High Molecular Wt./Med Tg/Med Si Func. | 792.0 | 17.90 | 2.7 |
| 7 | 4 arm Star/High Molecular Wt./Med Tg/Med Si Func. | 300.0 | 13.25 | 1.5 |
| 8 | 4 arm Star/Med Molecular Wt./Med Tg/Low Si Func. | 35.0 | 3.70 | 0.65 |
| 9 | 4 arm Star/Med Molecular Wt./Med Tg/High Si Func. | 38.0 | 4.80 | 0.70 |
| 10 | 4 arm Star/Med Molecular Wt./Low Tg/Med Si Func. | 7.2 | 1.20 | 0.35 |
| 11 | 4 arm Star/Med Molecular Wt./High Tg/Med Si Func. | 140.0 | 8.50 | 0.95 |
| 12 | 6 arm Star/Med Molecular | 54.0 | 4.60 | 0.75 |

TABLE 8-continued

| POLYMER DISP'N NUMBER | POLYMER TYPE | VISCOSITY (POISE) 70% NV | 60% NV | 50% NV |
|---|---|---|---|---|
| | Wt./Med Tg/High Si Func. | | | |

Viscosities of Polymer Dispersions 1 to 12

Where
"Med" - medium
"Wt." - weight
"Func." - functionality

It can be seen from Table 8 that in each case the Star polymer exhibits a lower viscosity than the corresponding linear polymer.

TABLE 9

Viscosities of Polymer Dispersions 21 to 26

| POLYMER DISP'N NUMBER | POLYMER TYPE | VISCOSITY (POISE) 50% NV | 40% NV |
|---|---|---|---|
| 21 | Linear/Med Molecular Wt./Low Tg/ Med Si & Carboxy Func | 2.30 | 0.55 |
| 22 | Star/Med Molecular Wt./Low Tg/ Med Si & Carboxy Func | 1.70 | 0.50 |
| 23 | Linear/Med Molecular Wt./Low Tg/ Med Si & Epoxy Func. | 0.30 | 0.10 |
| 24 | Star/Med Molecular Wt./Low Tg/ Med Si & Epoxy Func. | 0.27 | 0.10 |
| 25 | Linear/Med Molecular Wt./Low Tg/ Med Si & Isocyanate Func. | 0.51 | 0.12 |
| 26 | Star/Med Molecular Wt./Low Tg/ Med Si & Isocyanate Func. | 0.51 | 0.12 |

Where
"Med" - medium
"Wt." - weight
"Func." - functionality

It can be seen from Table 9 that the Star polymers exhibit lower or equivalent viscosities than their corresponding linear polymers.

APPLICATION AND TESTING OF THE COMPOSITIONS

Application

Clearcoat Compositions 1 to 12 and 21 to 26 were applied over glass substrates using a 400 micron block spreader at ambient temperature. A period of 24 hours elapsed before evaluation of the films was carried out.

Tests

Hardness: The hardness of the films was measured according to British Standard BS 3900:Part E5—Pendulum Damping test. The test was carried out after 24 hours, 3 days and 7 days.

Solvent Resistance: The films were rubbed with a rag soaked in methyl ethyl ketone. The number of double rubs which the film could sustain before deterioration resulted was recorded. The test was carried out after 24 hours, 3 days and 7 days.

Tables 10 and 11 below show the results of the film evaluation.

TABLE 10

Film evaluation results for Compositions 1 to 12

| COMPOSITION NUMBER | TYPE | HARDNESS 24 HRS | 3 DAYS | 7 DAYS | SOLVENT RESISTANCE 24 HRS | 3 DAYS | 7 DAYS |
|---|---|---|---|---|---|---|---|
| 1 | Linear/Low M Wt./ Med Tg/High Si Func. | 4 | 7 | 9 | 11 | 12 | 41 |
| 2 | 4 arm Star/Low M Wt./ Med Tg/Med Si Func. | 7 | 6 | 4 | 15 | 100 | 94 |
| 3 | Linear/Med M Wt./ Med Tg/Med Si Func. | 10 | 23 | 34 | 75 | 146 | 142 |
| 4 | 4 arm Star/Med M Wt./ Med Tg/Med Si Func. | 7 | 12 | 7 | 50 | 142 | 157 |
| 5 | Linear/High M Wt./ Med Tg/Med Si Func. | 19 | 39 | 54 | 21 | 270 | 620 |
| 6 | 4 arm Star/High M Wt./ Med Tg/Med Si Func. | 10 | 24 | 36 | 160 | 192 | >1000 |
| 7 | 4 arm Star/High M Wt./ Med Tg/Med Si Func. | 7 | 15 | 26 | 40 | 100 | 530 |
| 8 | 4 arm Star/Med M Wt./ Med Tg/Low Si Func. | 3 | 22 | 5 | 25 | 45 | 69 |
| 9 | 4 arm Star/Med M Wt./ Med Tg/High Si Func | 6 | 7 | 10 | 37 | 67 | 610 |
| 10 | 4 arm Star/Med M Wt./ Low Tg/Med Si Func. | 7 | 6 | 5 | 9 | 16 | 210 |
| 11 | 4 arm Star/Med M Wt./ | 7 | 15 | 15 | 12 | 22 | 209 |

TABLE 10-continued

| Film evaluation results for Compositions 1 to 12 | | HARDNESS | | | SOLVENT RESISTANCE | | |
|---|---|---|---|---|---|---|---|
| COMPOSITION NUMBER | TYPE | 24 HRS | 3 DAYS | 7 DAYS | 24 HRS | 3 DAYS | 7 DAYS |
| 12 | High Tg/Med Si Func 6 arm Star/Med M Wt./ Med Tg/High Si Func | 8 | 10 | 13 | 60 | 80 | 370 |

It can be seen from Table 10 that coating compositions based upon Star polymers exhibit superior resistance to solvent after 7 days than the corresponding coating compositions based upon linear polymers.

TABLE 11

| Film evaluation results for Compositions 21 to 26 | | HARDNESS | | | SOLVENT RESISTANCE | | |
|---|---|---|---|---|---|---|---|
| COMPOSITION NUMBER | TYPE | 24 HRS | 3 DAYS | 7 DAYS | 24 HRS | 3 DAYS | 7 DAYS |
| 21 | Linear/Med M Wt./ Low Tg/High Si & Carboxy Func. | 8 | 12 | 18 | 35 | 57 | 68 |
| 22 | Star/Med M Wt./ Low Tg/High Si & Carboxy Func. | 7 | 11 | 14 | 50 | 57 | 64 |
| 23 | Linear/Med M Wt./ Low Tg/High Si & Epoxy Func. | 9 | 14 | 27 | 38 | 100 | 220 |
| 24 | Star/Med M Wt./ Low Tg/High Si & Epoxy Func. | 9 | 12 | 18 | 50 | 102 | 214 |
| 25 | Linear/Med M Wt./ Low Tg/High Si & Isocyanate Func. | 17 | 30 | 32 | 45 | 79 | 80 |
| 26 | Star/Med M Wt./ Low Tg/High Si & Isocyanate Func. | 23 | 44 | 44 | 75 | 95 | 112 |

Where
"Med" - medium
"M Wt." - molecular weight
"Func." - functionality

It can be seen from Table 11 that the coating compositions based upon Star polymers exhibit superior early resistance to solvent that corresponding coating compositions based upon linear polymers.

We claim:

1. A copolymer comprising a hub portion from which radiate from 3 to 8 arms, the hub portion being the residue of a trifunctional to octafunctional thiol and each arm is an addition polymer comprising structural units and silicon functional units where the silicon functional units contain hydrolysable group-bearing silicon atoms for crosslinking.

2. A co-polymer according to claim 1 and having a total apparent weight average molecular weight of from 3,000 to 150,000 inclusive.

3. A co-polymer according to claim 2 where the hub portion is the residue of a tri, tetra, or hexafunctional thiol.

4. A co-polymer according to claim 3 where the hub portion is the residue of a tetra or hexafunctional thiol.

5. A co-polymer according to claim 4 where the hub portion is the residue of a thiol ester formed from a trifunctional to octafunctional alcohol and thio $C_{2-6}$ alkanoic acid.

6. A co-polymer according to claim 5 where the alcohol has formula (1):

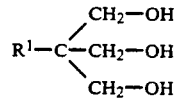

(1)

where $R^1$ is hydrogen, $C_{1-4}$ alkyl, hydroxy $C_{1-4}$ alkyl, or a group of formula (2):

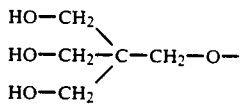

(2)

7. A co-polymer according to claim 6 where the mercapto $C_{2-6}$ alkanoic acid is 2-mercaptoacetic or 3-mercaptopropionic acid.

8. A co-polymer according to claim 1 and having auxiliary functional units containing wetting groups.

9. A co-polymer according to claim 1 where the silicon group-containing ethylenic monomers are acrylate and methacrylate esters of formula (4):

(4)

where
$R^3$ is hydrogen or methyl,
$R^4$ is $C_{1-4}$ alkyl,
$R^5$ is $C_{1-4}$ alkyl,
a is 0, 1 or 2
b is (3-a) and
d is 2 or 3.

10. A co-polymer according to claim 9 where the esters are 3-acryloxyethyltrimethoxysilane, 3-acryloxypropyltrimethoxysilane, 3-acryloxypropylmethylmethoxy-silane, 3-methacryloxypropyltriethoxysilane or 3-methacryloxypropylmethyldiethoxysilane.

11. A co-polymer according to claim 1 where the structural units are units derived from $C_{1-8}$ alkyl esters of acrylic or methacrylic acids, vinyl $C_{2-6}$ alkanoates and styrene and its $C_{1-4}$ alkyl analogues.

12. A co-polymer according to claim 11 where the structural units are derived from methyl methacrylate, ethyl methacrylate, butyl methacrylate, butyl acrylate and styrene.

13. A coating composition comprising a co-polymer according to claim 1 and a volatile liquid diluant or carrier.

14. A process for coating an object which comprises applying to the surface of the object a film of co-polymer according to claim 1 and allowing the polymer film to crosslink.

15. A copolymer according to claim 1 where the copolymer contains additional functional units having crosslinking groups which are the same or different for undergoing inter-molecular crosslinking with each other.

16. A co-polymer according to claim 15 where the additional functional group is derived from acrylic or methacrylic acid and the functional unit containing hydrolysable group-containing silicon atoms is derived from epoxy silanes of formula (6):

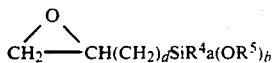
(6)

where
R$^4$ is $C_{1-4}$ alkyl,
R$^5$ is $C_{1-4}$ alkyl,
a is 0, 1 or 2,
b is (3-a) and
d is 2 or 3.

17. A co-polymer according to claim 15 where the additional functional group is derived from glycidyl methacrylate and the functional unit containing hydrolysable group-containing silicon atoms is derived from compounds of silanes of formula (7):

(7)

where
R$^8$ is HS— or R$^9$NH— where R$^9$ is hydrogen, methyl, aminoethyl, aminopropyl or carbamoyl,
R$^4$ is $C_{1-4}$ alkyl,
R$^5$ is $C_{1-4}$ alkyl,
a is 0, 1 or 2,
b is (3-a) and
d is 2 or 3.

18. A co-polymer according to claim 15 where the additional functional group is derived from 2-(3'-isopropenylphenyl)-2-isocyanatopropane and the functional unit containing hydrolysable group-containing silicon atoms is derived from compounds of formula (7):

(7)

where
R$^8$ is R$^9$NH—where
R$^9$ is hydrogen, methyl, aminoethyl, aminopropyl or carbamoyl,
R$^4$ is $C_{1-4}$ alkyl,
R$^5$ is $C_{1-4}$ alkyl,
a is 0, 1 or 2,
b is (3−a) and
d is 2 or 3.

19. The copolymer of claim 1 where the copolymer contains additional functional units having crosslinking groups for undergoing inter-molecular crosslinking with the hydrolysable group bearing silicon atoms.

20. The copolymer of claim 1 where the copolymer contains additional functional units having crosslinking groups for crosslinking with a crosslinking agent.

21. The copolymer of claim 1 where the copolymer contains additional functional units having crosslinking groups for inter-molecular crosslinking.

22. A co-polymer according to claim 21 where the additional functional unit contains the same crosslinking group and that group is either carboxy, epoxy, hydroxy or isocyanate.

23. A co-polymer according to claim 21 where the mole percentage of silicon group-containing monomers is from 9 to 14% and the mole percentage of additional functional units is from 9 to 13% of the total monomers making up the arms.

24. A process for preparing a co-polymer according to claim 1 which comprises either (a) co-reacting at moderate to elevated temperatures a tri- to octa-functional thiol chain transfer agent with ethylenically unsaturated monomers that polymerise to form functional units containing hydrolysable group-bearing silicon atoms, optionally ethylenically unsaturated monomers that polymerise to form additional functional units having crosslinking groups that are the same or different and that undergo crosslinking with each other and with the hydrolysable group-bearing silicon atoms and optionally ethylenically unsaturated monomers containing wetting groups or (b) co-reacting at moderate to elevated temperatures a tri- to octafunctional thiol chain transfer agent with ethylenically unsaturated monomers that polymerise to form structural units and functional units containing carboxy groups, epoxy groups or isocyanate groups and thereafter reacting carboxy group-containing co-polymer so formed at least partially with an epoxysilane, reacting an isocyanate group-containing co-polymer so formed at least partially with a mercaptosilane or aminosilane and reacting an epoxy group-containing co-polymer so formed at least partially with a mercaptosilane or an aminosilane and (c) reacting a product of step (b) containing epoxy groups with 4-amino or 4-nitrobenzoic acid.

25. A copolymer comprising a hub portion from which radiate from 3 to 8 arms, where the hub portion being the residue of a trifunctional to octafunctional thiol and each arm is an addition polymer comprising structural units and functional units where the functional units contain hydrolysable group-bearing silicon atoms, where the copolymer contains an additional functional unit which contains a carboxyl crosslinking group which undergoes crosslinking with the hydrolysable group-containing silicon atoms.

* * * * *